Dec. 13, 1927.
G. H. FORSYTH
DISK WHEEL
Filed April 30, 1921
1,652,433
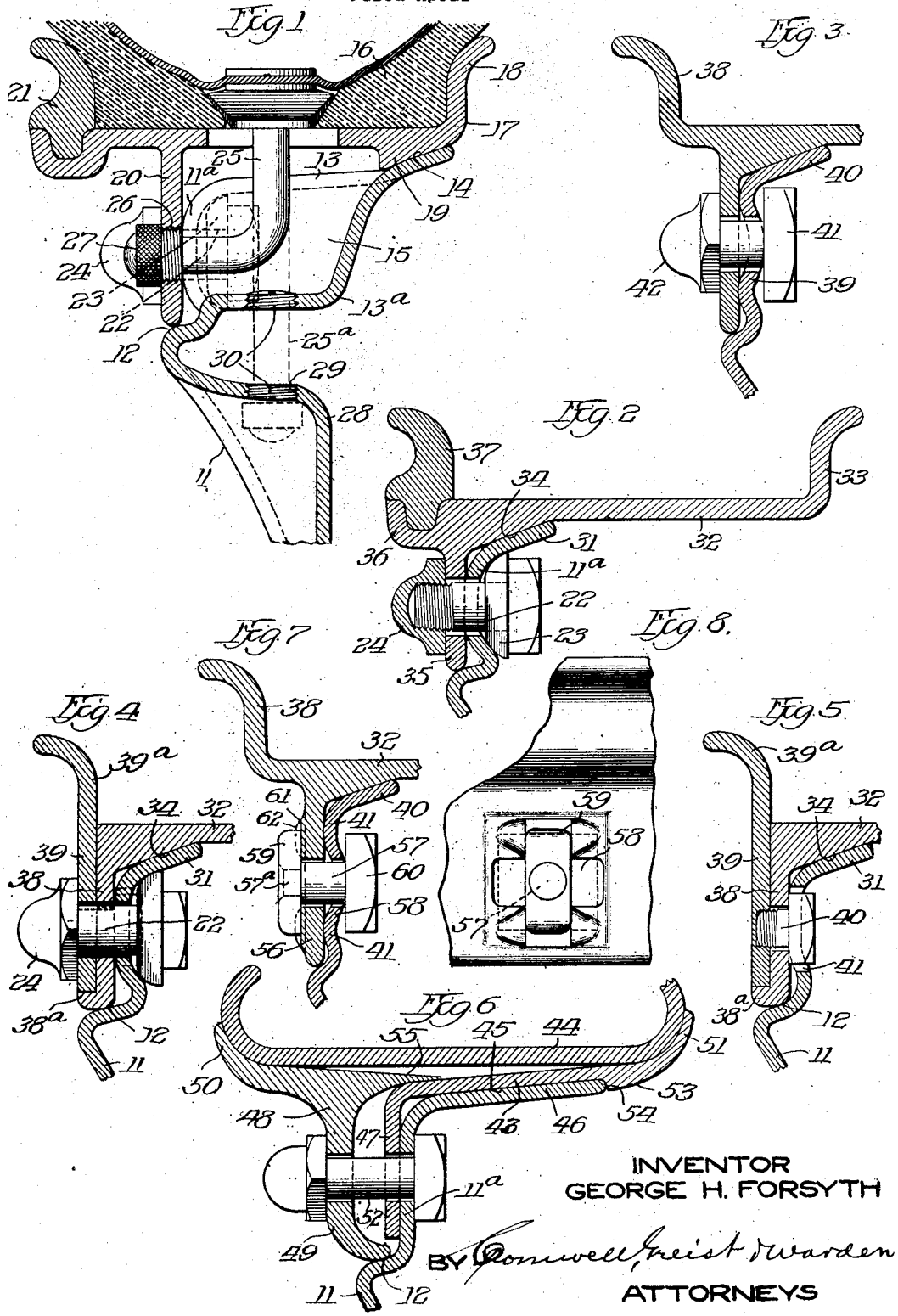
INVENTOR
GEORGE H. FORSYTH
ATTORNEYS Patented Dec. 13, 1927.

1,652,433

UNITED STATES PATENT OFFICE.

GEORGE H. FORSYTH, OF CHICAGO, ILLINOIS, ASSIGNOR, BY MESNE ASSIGNMENTS, TO STEEL WHEEL CORPORATION, OF LANSING, MICHIGAN, A CORPORATION OF MICHIGAN.

DISK WHEEL.

Application filed April 30, 1921. Serial No. 465,943.

This application contains subject matter disclosed in my application Serial No. 327,108 upon which Letters Patent No. 1,373,185 were issued to me under date of March 29, 1921, and also in my co-pending application Serial No. 396,776.

This invention has for its primary object a disk wheel construction characterized by economy of production, lightness, and ease of assembly, with a demountable or quick-detachable rim; also combining therewith provision for convenient access to the valve stem, and for stressing the disk.

Other advantages of the present wheel design will be apparent to those skilled in the art from the following description of chosen exemplifications of the invention taken in connection with the accompanying drawing upon which the description is predicated. It will be understood that the description and drawing are but illustrative of optional embodiments of the invention, wherefore they are not to be construed in a narrow sense as unnecessarily limiting the scope of the invention as set forth in the appended claims.

In the accompanying drawings Fig. 1 is a fragmentary transverse section through the peripheral portion of a wheel, illustrating the assembly of the wheel and rim and the disposition of the valve stem; and Figs. 2, 3, 4, 5, 6, 7 and 8 are similar views of modified constructions embodying the same invention, Figs. 4 and 5 representing parallel sections through the same embodiment.

Having particular reference to Fig. 1 of the drawing, the wheel disk is indicated at 11 provided with an annular shoulder step or bead at 12 and rearwardly offset at 13 and marginally inclined to the wheel axis to form a rear rim retaining stop at 14. The section being taken in Fig. 1 at the valve stem, the portion 13 of the disk has its continuity interrupted by a slot-like depression or opening at each side and in front of the valve stem and the resultant sheared or deflected metal is inwardly cupped at 13ᵃ to form a pocket 15 for the accommodation and protective housing of the stem of the ordinary pneumatic tire 16, as will be treated further hereinafter.

Mounted upon the periphery of the wheel is a tire-supporting member represented in Fig. 1 as a tire-carrying rim 17 having along its rear edge a permanent tire-retaining bead 18 and upon its inner face adjacent the rear edge a portion 19 inclined to the wheel axis at an angle corresponding substantially to the inclined margin 14 of the disk upon which it has a wedging constrictive bearing.

In front of the bearing portion 19 and preferably in front of the median line of the rim there is provided an inwardly extending rim-retaining flange 20 shown as formed integrally with the rim although, obviously, it may be separately formed and fixedly secured thereto or independent of and bearing against the rim as with the usual rim-retaining ring or clip shown in Fig. 6. This flange extends in front of the disk portion 11ᵃ and is arranged to have a lateral bearing thereagainst, the flange serving as a means of attachment for the rim to the wheel in a manner equivalent to that of the ordinary rim-retaining ring or clip of Fig. 6. Forwardly of the flange 20 the rim is lipped to receive the removable beaded tire-retaining element 21, although the beads front and rear may be permanently associated with the rim.

The rim is attached to the disk of the wheel by means of bolts 22 the head portions of which, either directly or by means of washers 23, bear upon the rear face of the disk adjacent the bend thereof and, as the bolts are drawn home by means of their nuts 24, tend to flatten the bend of the disk and thus impart to the latter a nut locking function to prevent the loosening of the nuts 24. Incidentally the flattening of the angle at the bend of the disk tends to throw the marginal portion 14 of the disk outwardly against the portion 19 of the rim, increasing the reaction between the disk and rim whereby the latter is subjected to radial compressive stress.

As shown in full lines in Fig. 1, the offset valve stem 25 is accommodated within the pocket 15 and has its outer end extending through a threaded aperture 26 of the rim-retaining flange 20, its end being closed by the valve cap 27 which takes over the same providing extended bearing surface and which is threaded into the opening 26, thus giving convenient access to the valve stem from the front of the wheel. The disk may also be provided inwardly of the shoulder 12 with a rearwardly cupped pocket as indicated at 28 in line with the valve stem axis, the upper wall of the pocket being provided with a threaded aperture 29 for the accommodation of the ordinary valve stem indicated by dotted lines at 25$^a$. Whether a straight or offset valve stem be associated with the tire in use, that threaded aperture which is not in use may be closed by a threaded plug 30 which is adapted to fit any one of the apertures.

In Fig. 2 a somewhat different form of construction is shown, similar in principle, wherein the marginal portion of the disk terminates at 31 short of the rear edge of the rim. Here the rim 32 has an overhanging rear portion provided with an integral tire-retaining bead 33. The rim in front of its median line has a portion 34 inclined to the wheel axis similar to the margin 31 of the disk upon which it is adapted to bear. As shown in the former case, the rim has an inwardly extending flange 35 and a forward lip 36 to support the beaded tire-retaining element 37. It will readily be understood that as the bolts 22 are drawn home by means of the nuts 24, the inclined portions of the disk and rim at 31 and 34 will ride upon each other, whereby the rim will exert constrictive pressure upon the disk margin and thus place the disk under radial compressive stress; while the head portions of the bolts by means of the washers 23 will tend to flatten the angle of inclination between the margin 31 and the disk portion 11$^a$, producing a back-kick which serves as a nut lock as in the former case.

In Fig. 3 the construction and operation is the same except that an integral tire-retaining bead 38 takes the place of the removable element 37, and that portion of the disk at 39 adjacent the inclined portion 40 is reversely bent to present a convex surface to the bearing pressure of the bolt head 41, obviating the employment of a washer and resulting in the same stressing of the disk and locking of the nuts 42 as the rim is assembled with the wheel.

In Figs. 4 and 5 is illustrated a rim construction and assembly which differs substantially from that previously described although employing the same inventive principle. The rim here shown corresponds substantially to that illustrated in Fig. 2 except that the same is cut off on a vertical line corresponding to the front face of the flange 35 of said Fig. 2. In this form of construction the flange 38, at the point where it bears upon the shoulder 12 projects forwardly at 38$^a$ to form a support for an inward extension 39 of the tire-retaining element beaded over at 39$^a$.

The portion 39 of the tire-retaining element rests against the front face of the flange 38 and is fixedly secured thereto, independently of the wheel disk, by means of bolts 40 extending through the flange 38, with the heads of the bolts bearing upon the rear of the flange and with the end of the bolt tapped into the element 39. Thus the tire-retaining element and the rim proper are removably associated, facilitating the demounting of the tire from the rim for repair and replacement.

When it is desired to assemble the rim and tire with relation to the wheel disk the rim is placed upon the disk with the heads of the bolts 40 in alignment with apertures 41 provided in the disk for their accommodation. Thereafter, the bolts 22, which occupy a staggered relation to the bolts 40, are placed in position and the rim is thereby forced upon the incline 31 of the disk, effecting a secure association of the two and a stressing of the disk.

Having reference to Fig. 6 of the drawing, the tire-supporting member 43 is used preferably but not necessarily in connection with a supplemental tire-supporting or carrying rim 44. The tire may be mounted directly upon the tire-supporting member 43, as will be obvious. Herein, the inclined portion 45 of the tire-supporting member 43 rests upon and has a constrictive bearing contact with the inclined marginal portion 46 of the disk 11 while, as in the former constructions, said member has an inwardly extending flange 47 disposed in front of and in bearing contact with the front face of the disk at 11$^a$. The tire-retaining element 48 has an inwardly extending portion 49 bearing upon the shoulder 12 and is also provided with a beaded portion 50 acting in cooperation with the beaded portion 51 of the tire-supporting member 43 to retain the tire therebetween either directly or by means of the interposed rim 44. Bolts 52 transfix the tire-retaining element, the flange and the disk and serve to maintain the same in assembled relation. In that form of construction shown in Fig. 6, the tire-supporting member 43 is assembled with the marginal portion 46 of the disk by moving the former laterally to the rear and causing its face 53 to override the inclined disk margin 46, forcing the latter inwardly against the spring reaction thereof, until the shoulder 54 of the member 43 snaps over the extreme edge of the disk margin, at which time the flange 47 will have contacted with the disk portion 11$^a$.

It will be observed that the tire-supporting member 43, locked against movement to the right by the flange 47 and movement to the left by the shoulder 54, serves to maintain the disk under inwardly directed stress when the tire or rim have been removed therefrom; also that the upturned beaded margin 51 of the member 43 serves as a positive stop to limit the rearward movement of a demountable rim 44, whereby the latter is accurately positioned at all times regardless of carelessness on the part of a person screwing up the bolts 52 unequally, as often happens. This same function of providing a positive stop to insure ultimate parallelism of the rim and wheel planes is performed in the other embodiments by the abutment of the rim flange against the disk.

As before stated, the last described form of construction is adapted for the mounting of a tire without a supplemental rim. The nose 55 of the tire-retaining element resting upon the upper face of the tire-supporting member 43 thus bridges the gap which would otherwise be present between the two members, and forms a continuous inner supporting surface for the tire casing and inner tube.

In Figs. 7 and 8 is shown, in radial section and face view respectively, a modified form of construction contributing to accuracy of placement of the rim on the wheel and also to ease of association and disassociation of the rim and wheel. Herein, the tire-retaining element 56 associated with the rim 32, instead of being provided with a circular aperture for the passage of the bolt shank 57 is provided with an elongated aperture or slot 58 of a size and shape corresponding substantially to that of the bolt head 59 which has a swivel connection with the reduced end portion 57ª of the bolt 57. The peripheral portion of the disk wheel body at 41 bears against the rear face of the retaining element 56 and is rearwardly bent at 58, as in Fig. 3, to present a resilient yielding portion interposed between the retaining element 56 and the fixed bolt head 60, the disk at this point being provided with a circular aperture as in the other forms of construction. The front face of the element 56 on opposite sides of the slot at points corresponding to the transverse axis thereof is elevated at 61 slightly above the general plane, this elevated portion being flanged on each side by ribs or shoulders 62.

In this form of construction the swivel head 59 of the bolt takes the place of the removable head or nut. The parts are assembled by disposing the head 59 parallel to the slot 58 and passing the same therethrough from the rear. The head 59 is then turned by a suitable tool at right angles to the slot and in doing so it rides over the shoulder 62 and drops into the space between the two shoulders and rests on the elevated portion 61. In this act, the disk portion 58 is compressed sufficiently to allow the head 59 to clear the shoulders and then reacts to hold the head firmly on the elevated portion, which elevation does not permit the disk portion 58 to completely resume its former position, thus maintaining a stressed relation between the fixed and movable bolt heads.

I claim:

1. In a disk wheel, the combination with the disk having a peripheral portion inclined to the wheel axis, of a tire-carrying rim having a portion similarly inclined, the two inclined portions in bearing contact, the rim having a flange extending inwardly in front of the inclined portions, and releasable means connecting the flange and disk whereby to assemble the rim and disk by lateral movement of the two inclined portions one upon the other, the flange and disk connecting means comprising bolts, the head portions of which when drawn home enter within an angle of the disk and tend to flatten said angle whereby to impart thereto a nut locking function.

2. In a disk wheel, the combination with the disk having a marginal portion inclined to the wheel axis, of a tire-carrying member having a portion similarly inclined, a retaining member fixedly associated with the tire-carrying member, and adjustable means acting on the retaining member and disk to force the inclined portions into wedged bearing relation, said means comprising bolts acting within an angle of the disk adjacent the inclined marginal portion and tending to flatten said angle whereby to impart thereto a nut locking function and to expand the margin of the disk.

3. In a wheel, the combination of a rim, a disk body forming a radial support and a lateral rear abutment for the rim, a rim-retaining member at the front of the rim and disk, and bolts adjustably connecting the disk and rim-retaining member, the bolts acting upon a dished portion of the disk and tending to flatten the same whereby to impart thereto a nut-locking function.

In testimony whereof I have hereunto signed my name.

GEORGE H. FORSYTH.